US008510757B2

(12) United States Patent
Subhraveti

(10) Patent No.: US 8,510,757 B2
(45) Date of Patent: Aug. 13, 2013

(54) GATHERING PAGES ALLOCATED TO AN APPLICATION TO INCLUDE IN CHECKPOINT INFORMATION

(75) Inventor: Dinesh Kumar Subhraveti, Milpitas, CA (US)

(73) Assignee: Google Inc., Mountain View, CA (US)

(*) Notice: Subject to any disclaimer, the term of this patent is extended or adjusted under 35 U.S.C. 154(b) by 1086 days.

(21) Appl. No.: 12/013,344

(22) Filed: Jan. 11, 2008

(65) Prior Publication Data
US 2009/0183181 A1 Jul. 16, 2009

(51) Int. Cl.
G06F 3/00 (2006.01)
G06F 9/44 (2006.01)
G06F 9/46 (2006.01)
G06F 13/00 (2006.01)
G06F 11/00 (2006.01)

(52) U.S. Cl.
USPC ............ 719/320; 719/310; 719/318; 714/100

(58) Field of Classification Search
None
See application file for complete search history.

(56) References Cited

U.S. PATENT DOCUMENTS

| | | | |
|---|---|---|---|
| 6,105,148 A | 8/2000 | Chung et al. | |
| 6,161,219 A | 12/2000 | Ramkumar et al. | |
| 6,718,538 B1 * | 4/2004 | Mathiske | 717/129 |
| 7,161,926 B2 | 1/2007 | Elson et al. | |
| 7,536,591 B2 | 5/2009 | Varadarajan et al. | |
| 7,644,413 B2 | 1/2010 | Wong et al. | |
| 7,793,153 B2 | 9/2010 | Subhraveti | |
| 2003/0088807 A1 | 5/2003 | Mathiske et al. | |
| 2006/0085679 A1 | 4/2006 | Neary et al. | |
| 2006/0150010 A1 | 7/2006 | Stiffler et al. | |
| 2008/0002578 A1 | 1/2008 | Coffman et al. | |

OTHER PUBLICATIONS

Litzkow, et al., "Condor—A Hunter of Idle Workstations", IEEE, 8th International Conference on Distributed Computing Systems, San Jose, CA, 1988, pp. 104-111.
Litzkow, et al., "Supporting Checkpointing and Process Migration Outside the Unix Kernel", Usenix Winter Conference, San Francisco, CA 1992.
"Inside Microsoft Windows 2000, Third Edition", Microsoft, [online] [retrieved Nov. 30, 2007] http://www.microsoft.com/mspress/books/sampchap/4354a.aspx.
Dieter, et al., "User-Level Checkpointing for Linux Threads Programs", Proceedings of the FREENIX Track, USENIX Annual Technical Conference, Boston, MA, Jun. 2001, pp. 81-92.
Osman, et al., "The Design and Implementation of Zap: A System for Migrating Computing Environments", Proceedings of the 5th Operating Systems Design and Implementation (OSDI 2002), Boston, MA, Dec. 2002.

(Continued)

Primary Examiner — Andy Ho
Assistant Examiner — Craig Dorais
(74) Attorney, Agent, or Firm — Young Basile Hanlon MacFarlane P.C.

(57) ABSTRACT

Provided are a method, system, and program for gathering pages allocated to an application to include in checkpoint information. A call from an application is intercepted to allocate memory pages to cause indication of pages allocated to the application that have modified data. An operation is initiated to create checkpoint information for the application. Pages allocated to the application that have modified data are determined in response to the operation to create the checkpoint information. The determined pages are saved in the checkpoint information.

13 Claims, 3 Drawing Sheets

(56) References Cited

OTHER PUBLICATIONS

"Microsoft Windows Internals, Fourth Edition: Microsoft Windows Server 2003, Windows XP, and Windows 2000", Microsoft, [online] [retrieved Nov. 25, 2007] http://book.itzero.com/read/microsoft/0507/Microsoft.Press.Microsoft . . . .

Mogul, et al., "Unveiling the Transport", ACM SIGCOMM Computer Communications Review, vol. 34, No. 1, Jan. 2004, pp. 99-106.

US Patent Application entitled "Gathering State Information for an Application and Kernel Components Called by the Application", SJO920070060US1, Serial No. unknown, filed Jan. 11, 2008, by inventor D.K. Subhraveti.

US Patent Application entitled "Checkpointing and Restoring User Space Data Structures Used by an Application", SJO920070117US1, Serial No. unknown, filed Jan. 11, 2008, by inventor D.K. Subhraveti.

First Office Action for U.S. Appl. No. 12/013,349, dated Jun. 9, 2011, 38 pgs.

Response to First Office Action, dated Sep. 9, 2011, pp. 1-14, for U.S. Appl. No. 12/013,349, filed Jan. 11, 2008, by inventors Dinesh Kumar Subhraveti et al.

\* cited by examiner

GATHERING PAGES ALLOCATED TO AN APPLICATION TO INCLUDE IN CHECKPOINT INFORMATION

BACKGROUND OF THE INVENTION

1. Field of the Invention

The present invention relates to a method, system, and article of manufacture for gathering pages allocated to an application to include in checkpoint information.

2. Description of the Related Art

An operating system includes a virtual memory manager to allocate pages in a memory to applications executed by the operating system. A memory manager may map received virtual addresses used by the operating system and application processes to addresses in one of the pages in memory. The data in the pages may include data and code used by application processes and data and code from a storage device. Pages may be stored in memory or swapped to the storage if there is not sufficient space for all the pages in the memory. If a process references a memory address that resolves within a page that is not available in the memory, then the memory manager generates a page fault to the operating system to cause the operating system to load the required page from a paging file in the storage.

Certain applications may gather state information on the execution of an application and pages in memory allocated to the application to store in checkpoint information. The state of an application maintained in checkpoint information may be used for debugging, development and record and replay purposes. A record and replay program would allow the restoration of an application state so the application may run from the state as indicated in the checkpoint information.

To fully record the state information of an application, the pages used by an application are recorded in checkpoint information. During restoration of the application, the data in the pages written to the checkpoint information would be written to pages allocated to the restored application to restore the pages of the application as they were when the checkpoint information was recorded.

There is a need in the art for improved techniques to gather and store page information related to application execution to allow improved recording of the checkpoint information for the application.

SUMMARY

Provided are a method, system, and program for gathering pages allocated to an application to include in checkpoint information. A call from an application is intercepted to allocate memory pages to cause indication of pages allocated to the application that have modified data. An operation is initiated to create checkpoint information for the application. Pages allocated to the application that have modified data are determined in response to the operation to create the checkpoint information. The determined pages are saved in the checkpoint information.

DETAILED DESCRIPTION

Figure 1:
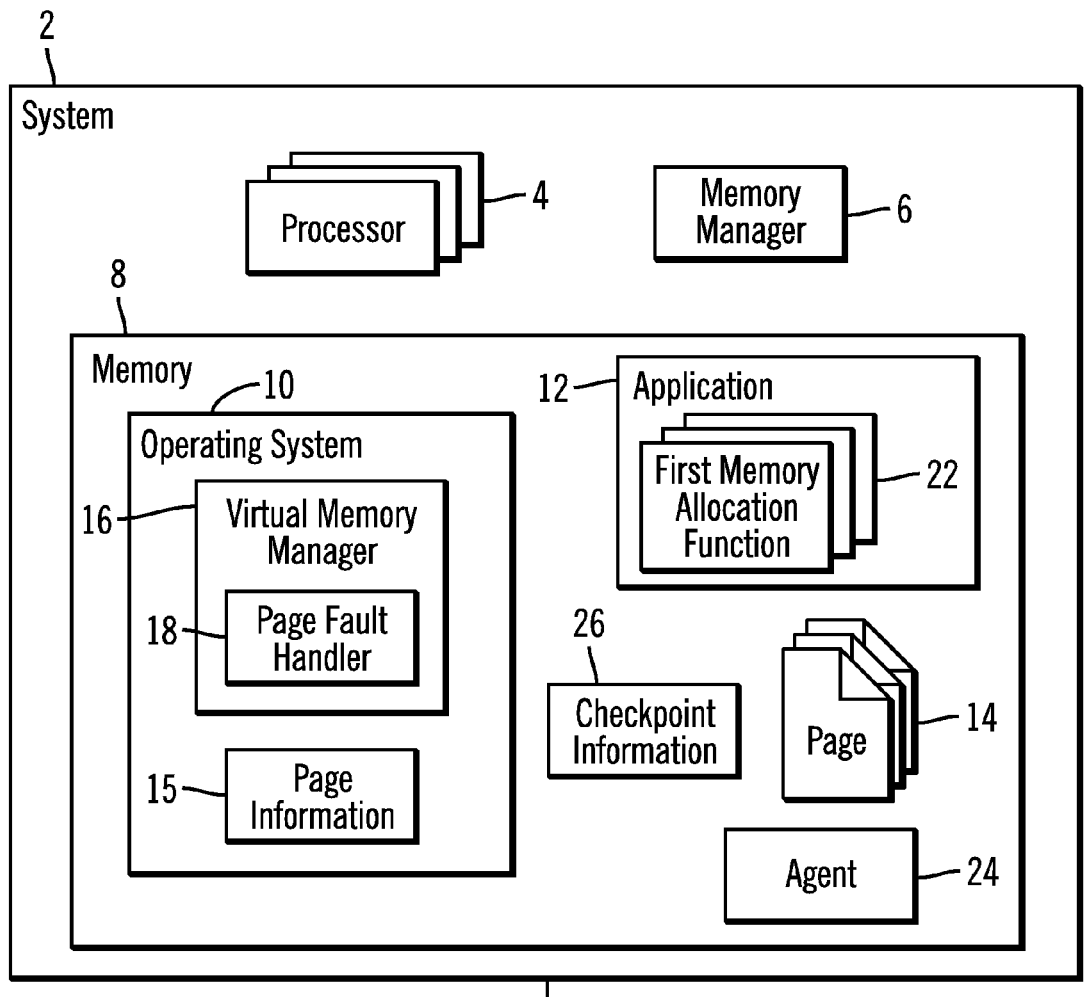
FIG. 1 illustrates an embodiment of a computing environment.

FIG. 1 illustrates an embodiment of a computing environment. A system 2 includes multiple processors 4 and a memory manager 6 managing access to a memory 8. The processor 4 loads into the memory 8 an operating system 10 providing a runtime environment for one or more applications 12. An operating system 10 scheduler may spawn tasks that perform the application 12 operations. The tasks spawned to perform application operations may comprise processes, threads, other units of executions allocated by the operating system, etc. A process may comprise one or more threads allocated to processor and computer resources to execute computer instructions. Multiple processes or multiple threads in one process may concurrently execute instructions for one application, or multiple processes may concurrently execute instructions for multiple applications. Multiple processes may execute on multiple processors. The term "process" as used herein refers to a process, thread or any other unit of execution allocated to execute instructions.

The memory manager 6 may map received virtual addresses used by the operating system 10 and application 12 processes to addresses memory pages. If the application 12 references a memory address that resolves within a page that is not available in the memory 8, then the memory manager 6 generates a page fault to a virtual memory manager 16 in the operating system 10 interfacing the memory manager 6 with the operating system 10. The virtual memory manager 16 includes a page fault handler 18 to process page fault errors from the memory manager 6. If the page fault error indicates a page is not in the memory 8, then the page fault handler 18 loads the required page 14 from a paging file in the storage 20.

The application 12 includes first memory allocation functions 22 that are called to allocate a page 14 in virtual memory to the application 12.

An agent 24 is loaded and initialized when the application 12 is initialized and loaded. The agent 24 may gather information related to the application 12's execution and pages 14 allocated to the application 12. The agent 24 may store the gathered information as checkpoint information 26 to provide state information related to the application 12 execution, including system information on the execution of the components called by the application 12. This checkpoint information 26 may be used to replicate the application 12 state on the same system 2 or a different system by restoring the application 12 to the state indicated in the checkpoint information 26. The applications 12 and other data may be stored and loaded from a storage 20, such as a non-volatile storage device.

Figure 2:
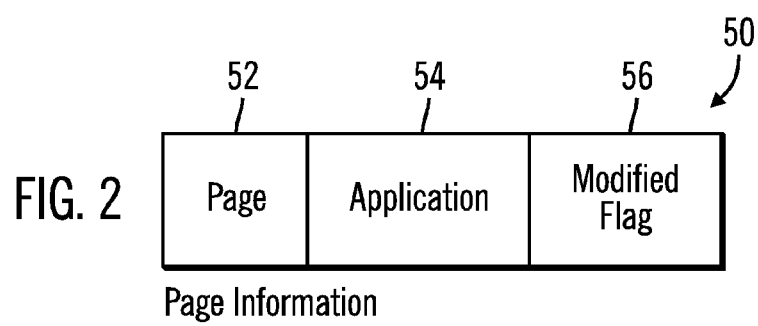
FIG. 2 illustrates an embodiment of page information.

The operating system 10 may maintain page information 15 having information on which pages allocated to the application 12 have modified data. FIG. 2 shows a page information instance 50 as indicating a page 52, the application 54 to which the page is allocated, and a modified flag 56 indicating whether the page has modified, i.e., dirty, data. The operating system 10 would set the modified flag 56 upon writing data to a page 14. When the modified data in the page is written to storage 20, the modified flag 56 for the page destaged to storage 20 may be cleared.

Figure 3:
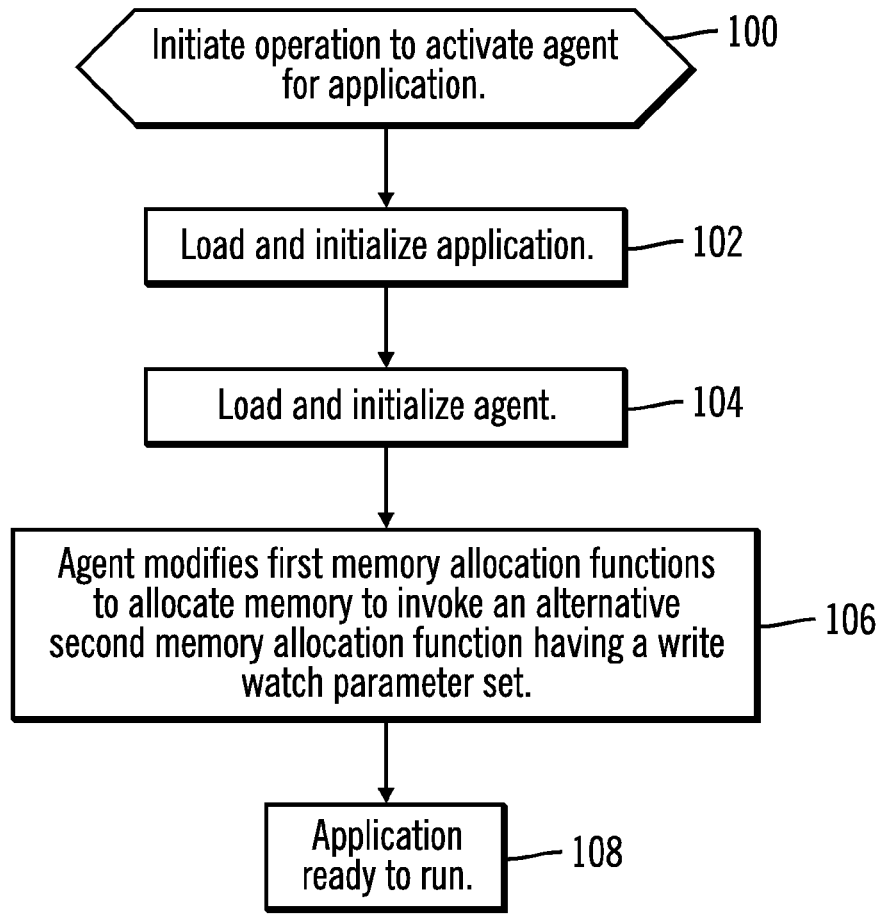
FIG. 3 illustrates an embodiment of operations to activate an agent that gathers state and system information for an application.
Figure 4:
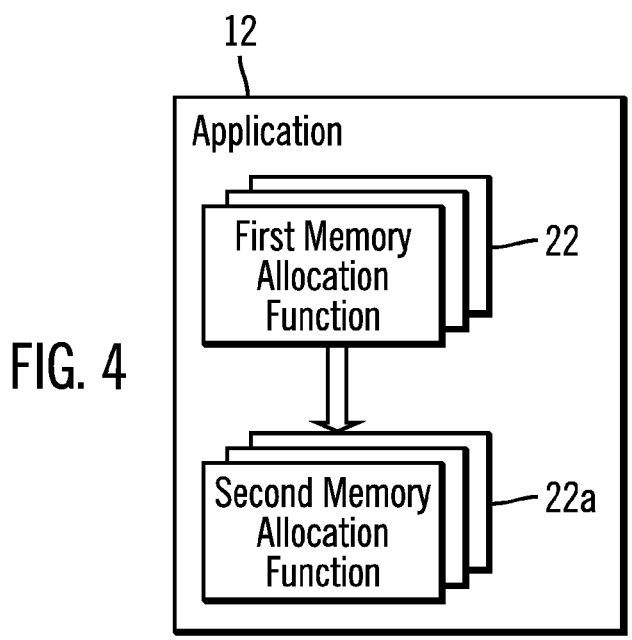
FIG. 4 illustrates an embodiment of first memory allocation functions being translated to second memory allocation functions.

FIG. 3 illustrates an embodiment of operations performed to load the agent 24. Upon initiating (at block 100) the operation to activate the agent 24, the application 12 is loaded and initialized (at block 102). The agent 24 may then be loaded and initialized (at block 104). In one embodiment, to enable the agent 24 to effectively intercept the first memory allocation functions 22, the agent 24 modifies (at block 106) application 12 to change the first memory allocation functions 22 to second memory allocation functions 22a, as shown in FIG. 4, having a write watch parameter set. This alternative memory allocation function 22a with the write watch parameter set causes the operating system 10 to indicate that a page is modified by setting the modified flag 56 for the page when data in the page is updated. In this way, the agent 24 translates the first memory allocation functions 22 to redirect them to an alternative second memory allocation function 22a that includes a write watch parameter. FIG. 4 illustrates an embodiment of how the first memory allocation functions 22 in the application 12 are converted or translated to alternative second memory allocation functions 22a. The application 12 may then run (at block 108) and invoke the second memory allocation functions 22a having the write watch parameter set. In one embodiment, the operating system 10 may provide the first 22 and second 22a memory allocation functions as application programming interfaces (APIs) to invoke operating system 10 operations.

In one embodiment, the agent 24 may reside in the address space of the application 12 and comprise dynamic linked library (dll) files, such that the agent 24 dll is loaded when the application is loaded. The agent 24 may provide hooks that provide the namespace containment by translating the first memory allocation functions 22 to second memory allocation functions 22a having the write watch parameter set. Alternative techniques known in the art may be used to have the agent 24 intercept the application 12 memory allocation functions 22 to redirect the calls to an alternative second memory allocation function 22a that causes the operating system 10 to indicate whether a page 14 has modified data.

Figure 5:
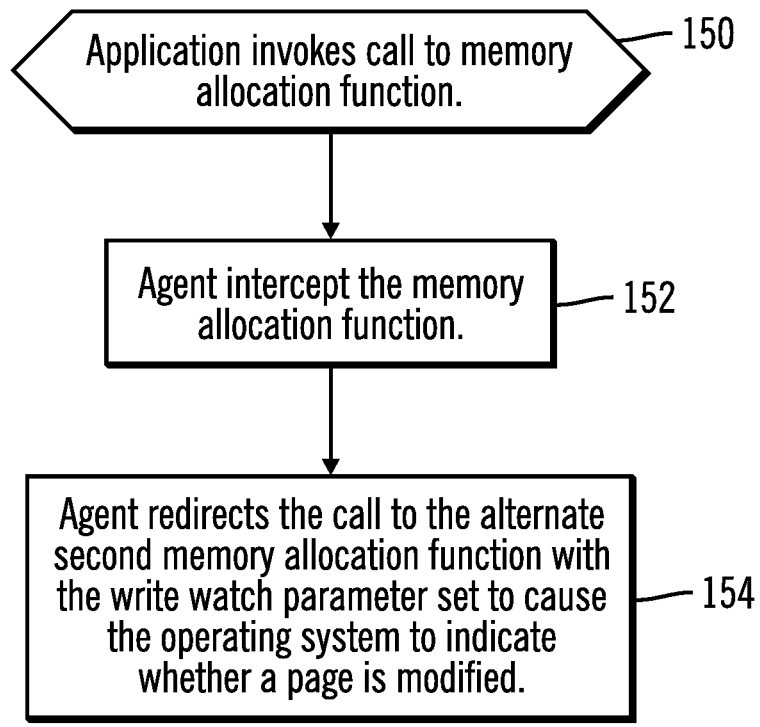
FIG. 5 illustrates an embodiment of operations to allocate memory to an application.

FIG. 5 illustrates an embodiment of operations performed when the application 12 invokes a memory allocation function 22. Upon the application 12 invoking (at block 150) the first memory allocation function 22, the agent 24 intercepts (at block 152) the first memory allocation function 22 and redirects (at block 154) the call to the alternative second 22a memory allocation function that has the write watch parameter.

As discussed, the write watch parameter causes the operating system 10 to indicate in the page information 50 for the application page 14 whether the page 52 (FIG. 2) has modified data by setting the modified flag 56. In response to modifying data in a page 14, the operating system 10 determines whether a page was allocated with the write watch parameter set. If so, the operating system sets the modified flag 56 for the page. Otherwise, if the page was not allocated with the write watch parameter set, the operating system 10 may not set the modified flag 56 in the page information. This modified flag 56 that is used by the operating system 10 to report to the agent 24 pages that have been modified may be in additional to any flags in page metadata indicating that a page has dirty data, where the memory manager 6 uses the page metadata for page management operations.

Figure 6:
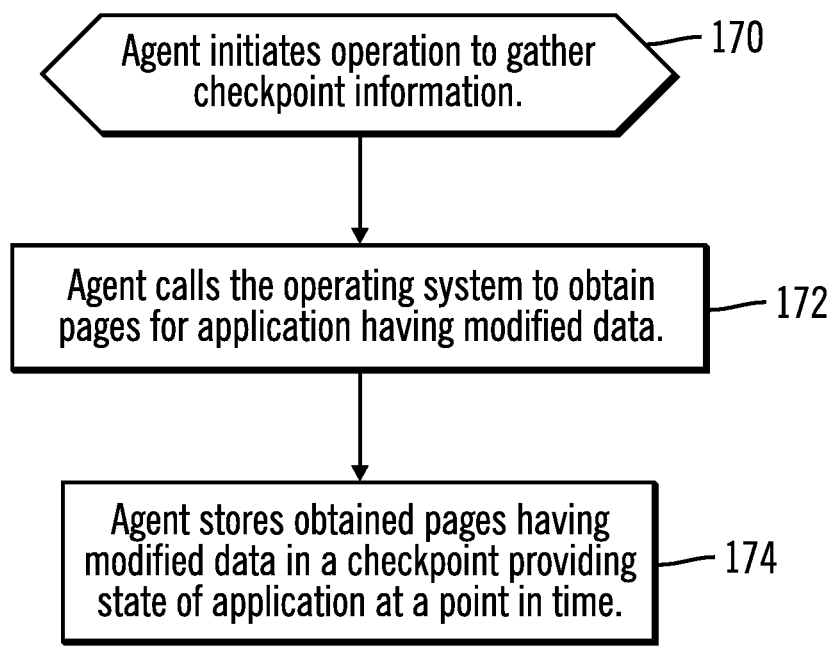
FIG. 6 illustrates an embodiment of operations to gather checkpoint information.

FIG. 6 illustrates an embodiment of operations performed by the agent 24 to gather state information for the application 12 to store in the checkpoint information 26. Upon initiating (at block 170) an operation, e.g., API, to gather checkpoint information 26, the agent 24 calls (at block 172) the operating system 10 to obtain pages for application having modified data. There may be an operating system 10 API that allows processes to access the pages for an application 12 having modified data. The operating system 10 may return pages for the application whose page information 50 indicates the page as having modified data. The agent 24 stores (at block 174) the obtained pages having modified data in checkpoint information 26 providing state of the application 12 at a point in time. Pages 14 allocated to the application that do not have modified data are not saved in the checkpoint information 26.

Once the state and system information is stored with the checkpoint information 26, a checkpoint manager or other program may resume the operation of the application 12 from the state represented in the checkpoint information 12. The address space of the recreated application 12 may be populated with the memory state information stored in the checkpoint information 12. To recreate an application 12, a new process for the application is created. In the Microsoft® Windows® operating system environment, the newly created process may contains the executable image, ntdll.dll, process environment block (PEB), thread environment block (TEB), and other system regions such as ANSI code page, shared memory data, mapped at the top of the process address space. The data segment portions of the executable image and ntdll.dll are overwritten from the respective contents saved in the checkpoint information 26. The rest of the address space of the process may be populated with the memory regions described by the checkpoint information 26. The application 12 default heap, thread stacks, regions containing the loader data and process environment variables, etc. are restored by mapping memory regions with appropriate size and attributes and overwriting them with the contents saved in the checkpoint information 26 without regard to their internal structure. In particular, the memory region containing the agent 24 is also mapped, so that the restarted instance of the process already has the agent 24 for subsequent checkpoints. Further, the pages 14 for the application may be reallocated and the pages having modified data stored in the checkpoint information 26 may overwrite the pages allocated to the restored application 12.

The described embodiments provide techniques to store pages allocated to an application in a manner that conserves space in the checkpoint information by providing a mechanism for the checkpoint agent to determine those application pages having modified data and only storing application pages having modified data. Pages allocated to the application that do not have modified data are not stored so as to conserve space in the checkpoint information.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable storage medium", where a processor may read and execute the code from the computer storage readable medium. A computer readable storage medium may comprise storage media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The "article of manufacture" may comprise a transmitting station and/or a receiving station for transmitting and receiving transmission signals in which the code or logic is encoded, where the code or logic encoded in the transmission signal may be decoded and stored in hardware or a computer readable storage medium at the receiving and transmitting stations or devices. An "article of manufacture" comprises a computer readable storage medium, hardware device, and/or transmission transmitters or receivers in which code or logic may be implemented. Those skilled in the art will recognize that many modifications may be made to this configuration without departing from the scope of the present invention, and that the article of manufacture may comprise suitable information bearing medium known in the art.

Described embodiments discussed certain implementations in the Microsoft® Windows® operating system environment. However, the embodiments described herein may be used with operating systems other than Microsoft® Windows® to allow checkpointing and restoration of application pages.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3, 5, and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    intercepting a call from an application to an operating system before the call is received by the operating system, the call including a request for the operating system to allocate a plurality of memory pages to the application to reserve the plurality of memory pages for use by the application;
    in response to intercepting the call, processing the call such that the plurality of memory pages allocated to the application based on the call are allocated such that modifying data in a memory page from the plurality of memory pages includes indicating that the memory page includes modified data, wherein processing the call includes translating a first memory allocation function to a second memory allocation function such that a write watch parameter is set;
    in response to data in the memory page being modified by the application, determining whether the modified memory page was allocated with the write watch parameter as set;
    on a condition that the modified memory page is determined to have been allocated with the write watch parameter as set, indicating that the memory page includes modified data;
    initiating an operation to create checkpoint information for the application after the call to allocate the memory pages is processed and after the memory page is modified;
    obtaining the memory page allocated to the application indicated as having modified data in response to the operation to create the checkpoint information; and
    saving the obtained memory page in the checkpoint information.

2. The method of claim 1, wherein memory pages allocated to the application not including modified data are not saved in the checkpoint information.

3. The method of claim 1, wherein the write watch parameter directs the operating system to allocate the plurality of memory pages such that the operating system will indicate memory pages from the plurality of memory pages that have modified data.

4. The method of claim 1, wherein obtaining the memory page comprises:
calling, by a checkpoint agent, the operating system to determine memory pages allocated to the application that have modified data, wherein the checkpoint agent determines memory pages allocated to the application that have modified data from the operating system.

5. A system, comprising:
a processor;
a computer readable medium having an agent and an application, wherein the agent is executed by the processor to perform operations, the operations comprising:
intercepting a call from the application to an operating system before the call is received by the operating system, the call including a request for the operating system to allocate a plurality of memory pages to the application to reserve the plurality of memory pages for use by the application;
in response to intercepting the call, processing the call such that the plurality of memory pages allocated to the application based on the call are allocated such that modifying data in a memory page from the plurality of memory pages includes indicating that the memory page includes modified data, wherein processing the call includes translating a first memory allocation function to a second memory allocation function such that a write watch parameter is set;
in response to data in the memory page being modified by the application, determining whether the modified memory page was allocated with the write watch parameter as set;
on a condition that the modified memory page is determined to have been allocated with the write watch parameter as set, indicating that the memory page includes modified data;
initiating an operation to create checkpoint information for the application after the call to allocate the memory pages is processed and after the memory page is modified;
obtaining the memory page allocated to the application indicated as having modified data in response to the operation to create the checkpoint information; and
saving the obtained memory page in the checkpoint information.

6. The system of claim 5, wherein memory pages allocated to the application not including modified data are not saved in the checkpoint information.

7. The system of claim 5, wherein the write watch parameter that directs the operating system to allocate the plurality of memory pages such that the operating system will indicate memory pages from the plurality of memory pages that have modified data.

8. The system of claim 5, wherein obtaining the memory page comprises:
calling the operating system to determine memory pages allocated to the application that have modified data, wherein the agent determines memory pages allocated to the application that have modified data from the operating system.

9. An article of manufacture comprising a computer readable storage medium having code executed to perform operations, the operations comprising:
intercepting a call from an application to an operating system before the call is received by the operating system, the call including a request for the operating system to allocate a plurality of memory pages to the application to reserve the plurality of memory pages for use by the application;
in response to intercepting the call, processing the call such that the plurality of memory pages allocated to the application based on the call are allocated such that modifying data in a memory page from the plurality of memory pages includes indicating that the memory page includes modified data, wherein processing the call includes translating a first memory allocation function to a second memory allocation function such that a write watch parameter is set;
in response to data in the memory page being modified by the application, determining whether the modified memory page was allocated with the write watch parameter as set;
on a condition that the modified memory page is determined to have been allocated with the write watch parameter as set, indicating that the memory page includes modified data;
initiating an operation to create checkpoint information for the application after the call to allocate the memory pages is processed and after the memory is modified;
obtaining the memory page allocated to the application indicated as having modified data in response to the operation to create the checkpoint information; and
saving the obtained memory page in the checkpoint information.

10. The article of manufacture of claim 9, wherein memory pages allocated to the application not including modified data are not saved in the checkpoint information.

11. The article of manufacture of claim 9, wherein the write watch parameter that directs the operating system to allocate the plurality of memory pages such that the operating system will indicate memory pages from the plurality of memory pages that have modified data.

12. The article of manufacture of claim 9, wherein the code to perform obtaining the memory page further includes agent code to perform:
calling the operating system code to determine memory pages allocated to the application that have modified data, wherein the agent determines memory pages allocated to the application that have modified data from the operating system code.

13. The method of claim 1, wherein allocating the plurality of memory pages includes assigning the plurality of memory pages for subsequent write access by the application.

* * * * *